(12) United States Patent
Saeki et al.

(10) Patent No.: US 6,494,413 B1
(45) Date of Patent: Dec. 17, 2002

(54) WIRE HARNESS-FIXING CLAMP

(75) Inventors: Shinichi Saeki, Shizuoka (JP); Kenji Yamazaki, Shizuoka (JP); Ikuo Takeda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/639,341

(22) Filed: Aug. 16, 2000

(30) Foreign Application Priority Data

Aug. 20, 1999 (JP) .......................................... 11-233535

(51) Int. Cl.$^7$ ................................................ F16L 3/22
(52) U.S. Cl. ................... 248/68.1; 248/74.2; 174/72 A; 24/547; 24/561
(58) Field of Search .......................... 24/545, 547, 555, 24/556, 561, 562, 563; 248/74.1, 74.2, 316.7, 68.1, 61, 63; 174/72 A

(56) References Cited

U.S. PATENT DOCUMENTS

| | | | | |
|---|---|---|---|---|
| 1,995,370 A | * | 3/1935 | Walters | 248/68.1 |
| 3,042,353 A | * | 7/1962 | O'Mara | 248/544 |
| 3,668,744 A | * | 6/1972 | Moody et al. | 403/188 |
| 4,156,795 A | * | 5/1979 | Lacan | 174/97 |
| 4,865,279 A | * | 9/1989 | Kosugi | 248/68.1 |
| 5,027,538 A | * | 7/1991 | Wilmes et al. | 40/316 |
| 5,496,005 A | * | 3/1996 | Dieringer | 248/74.2 |
| 5,645,252 A | * | 7/1997 | Fisher | 248/74.2 |
| 6,268,566 B1 | * | 7/2001 | Takiguchi et al. | 174/72 A |

FOREIGN PATENT DOCUMENTS

JP 63-179717 11/1988

* cited by examiner

Primary Examiner—Ramon O. Ramirez
Assistant Examiner—Jon Szumny
(74) Attorney, Agent, or Firm—Sughrue Mion, PLLC

(57) ABSTRACT

A holding recess (14) for holding the self-supporting-type cable (1) is formed between elastic holding portions (12, 13). Retaining projections (12a, 13a) are formed respectively on those side surfaces of the elastic holding portions (12, 13), exposed to the holding recess (14), in stepped relation to each other. Even when the self-supporting-type cable (1) is held in any posture, with its cable body portion (2) or its wire support portion (3) first introduced into the holding recess (14), the cable body portion (2) is engaged with the two retaining projections (12a, 13a) in a press-contacted manner to be prevented from withdrawal, or the cable body portion is engaged with the retaining projection (13a) and the bottom of the holding recess (14) in a press-contacted manner, and therefore is held in a stable manner.

9 Claims, 2 Drawing Sheets

WIRE HARNESS-FIXING CLAMP

BACKGROUND OF THE INVENTION

1. Field of the Invention

The present invention relates to a wire harness-fixing clamp for holding a wire harness comprising wires or a cable, and more particularly to such a clamp suited for holding a self-supporting-type communication cable called "a hanger gourd-shaped cable".

The present application is based on Japanese Patent Application No. Hei. 11-233535, which is incorporated herein by reference.

2. Description of the Related Art

FIG. 3 is a cross-sectional view showing a self-supporting-type cable 1 (called "a hanger gourd-shaped cable") which is a kind of communication cable.

The self-supporting-type cable 1, having the illustrated configuration, includes a cable body portion 2, and a support wire portion 3 integrally formed with the cable body portion 2. Such self-supporting-type cables have various characteristics, and therefore have been extensively used in accordance with the purpose of use and a place where it is used. The cable body portion 2 comprises a conductor (cable core) 2a, an insulating layer 2b formed on the conductor 2a to cover the same, and a protective sheath 4 formed on the insulating layer 2b to cover the same. The support wire portion 3 comprises a support wire 3a, and the sheath 4 formed on the support wire 3a to cover the same, so that the support wire portion 3 is integrally connected to the cable body portion 2. The cable body portion 2 and the support wire portion 3 are interconnected by a sheath connection portion 4a at the boundary between the two portions 2 and 3.

In the installation of the self-supporting-type cable 1 of the above configuration, this cable is often fixed by clip-type clamps at suitable portions thereof spaced along the entire length thereof. One example of such clamps is a wire harness clamp disclosed in Unexamined Japanese Utility Model Publication No. Sho. 63-179717.

This clamp 5, shown in FIGS. 4A and 4B, includes a pair of left and right elastic holding portions 5a and 5b extending upwardly from a clamp body molded of a resin, and a holding recess 5c of an upwardly-open U-shape (in the drawings) is formed between the two elastic holding portions 5a and 5b. A retaining projection 5d is formed at an upper end of one of the elastic holding portions 5a, and bulges to be exposed to the holding recess 5c.

When installing the self-supporting-type cable 1, this cable 1 is fixed to a mounting panel or the like at suitable portions thereof by the use of the clamps 5. More specifically, when the clamp 5 is mounted in an upwardly-directed posture as shown in FIG. 4A, the self-supporting-type cable 1 is usually fitted into the holding recess 5c, with the support wire portion 3 directed downwardly, so that the cable body portion 2 is disposed at a level above the support wire portion 3. The cable body portion 2, thus disposed at the higher level, is held between the left and right elastic holding portions 5a and 5b, and is retained by the elastic force of the resin, and the retaining projection 5d is press-contacted with the cable body portion 2 to prevent the same from withdrawal from the holding recess 5c.

When the self-supporting-type cable 1 is set in an inverted posture in the related clip-type clamp 5 as shown in FIG. 4B, there is encountered the following disadvantage. More specifically, when the self-supporting-type cable 1 is attached to the clamp 5 in such a manner that the cable body portion 2 is directed downwardly, and is first fitted into the holding recess 5c, the support wire portion 3 projects outwardly from the clamp 5, so that the fixing of the cable is unstable. As a result, in use, the cable can flutter to produce noises, and in the worst case, the self-supporting-type cable is disengaged from the clamp 5.

SUMMARY OF THE INVENTION

It is therefore an object of the present invention to provide a wire harness-fixing clamp particularly best suited for holding a self-supporting-type communication cable (called "a hanger gourd-shaped cable) among wire harnesses in a stable condition.

To achieve the above object, according to the first aspect of the present invention, there is provided a wire harness-fixing clamp which comprises a clamp body, a pair of elastic holding portions extending from the clamp body, the elastic holding portions being opposed to each other to form therebetween a holding recess, into which a wire is insertable, and which is operative to hold the wire, and a plurality of retaining projections formed respectively on the elastic holding portions to project into the holding recess, wherein when the wire is inserted into the holding recess, at least one of the retaining projections is operative to retain the wire in the holding recess. When the wire is held in the holding recess, the retaining projections are operative to engage the wire from such a direction as to prevent withdrawal of the wire from the holding recess. The retaining projections may be formed in a bulged manner respectively on inner surfaces of the elastic holding portions.

In the related art, the retaining projection is formed on only one of the elastic holding portions, and therefore there were occasions when the fixing of the wire harness was unstable. In the above construction of the present invention, however, the retaining projections are formed on the opposed elastic holding portions, respectively, and therefore even when the wire harness is set in any posture, the clamp can hold the wire harness in a stable manner.

According to the second aspect of the present invention, the wire may include a body portion, a connection portion, and a support wire portion connected to the body portion through the connection portion. In this case, when the wire is inserted into the holding recess so that the support wire portion is first introduced into the holding recess, the body portion is engaged with the retaining projections to be prevented from withdrawal from the holding recess. Further, when the wire is inserted into the holding recess so that the body portion is first introduced and pressed into the holding recess, the body portion is engaged with one of the retaining projections and a bottom of the holding recess. The wire may be a self-supporting-type cable having a hanger gourd-shape.

Accordingly, even when the wire is set in a proper posture or an inverted posture, with the support wire portion or the body portion first introduced into the holding recess, the body portion is positively held in a press-contacted manner, and therefore the self-supporting-type cable is positively held in a stable condition.

According to the third aspect of the present invention, it is preferable that the retaining projections are offset from each other in a longitudinal direction of the holding recess. More specifically, one of the retaining projections may be formed on an intermediate portion of one of the elastic holding portions, and the other one of the retaining projections may be formed on a distal end portion of the other one of the elastic holding portions. In this case, the retaining projections press-contact with the body portion of the wire, or the one of the retaining projections and the bottom of the holding recess press-contact with the body portion of the wire.

That is, the retaining projections are formed on the suitable portions of the opposed elastic holding portions, respectively. More specifically, the one retaining projection is formed on one of the two elastic holding portions intermediate the opposite ends thereof, whereas the other retaining projection is formed on the distal end portion of the other elastic holding portion. With this construction, the body portion is held between the two retaining projections, and are press-contacted with these retaining projections to be prevented from withdrawal from the holding recess. Alternatively, the body portion is held between the one retaining projection and the bottom of the holding recess in a press-contacted manner, and therefore is stably held against withdrawal from the holding recess.

DETAILED DESCRIPTION OF THE PREFERRED EMBODIMENT

Figure 1:
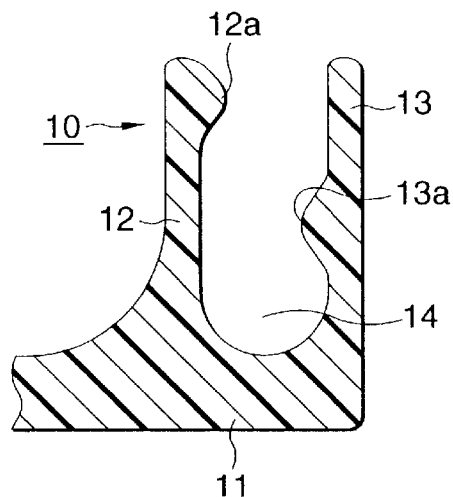
FIG. 1 is a cross-sectional view of a preferred embodiment of a wire harness-fixing clamp of the present invention.

A wire harness-fixing clamp of the present invention and particularly such a clamp, designed to hold a self-supporting-type cable of a hanger gourd-shape, will now be described in detail with reference to the drawings. The self-supporting-type cable to be held by this clamp is the same as that shown in FIG. 3, and therefore identical reference numerals will be used for this cable, and explanation thereof will be omitted.

FIG. 1 is a cross-sectional view of the clamp 10 of this embodiment. This clamp 10 includes a pair of opposed left and right elastic holding portions 12 and 13 extending upwardly from a clamp body 11 molded of a resin, and a holding recess 14 of a generally upwardly-open U-shape (in the drawings) is formed between the two elastic holding portions 12 and 13. A retaining projection 12a is formed in a bulged manner on the side surface of a distal end portion of one elastic holding portion 12 exposed to the holding recess 14. Also, a retaining projection 13a is formed in a bulged manner on the side surface of the other elastic holding portion 13 exposed to the holding recess 14, and is disposed intermediate opposite ends of the elastic holding portion 13. Namely, the retaining projections 12a and 13a, projecting respectively from the left and right elastic holding portions 12 and 13, are generally opposed to each other in stepped relation to each other, with the holding recess 14 disposed therebetween.

Figure 3:
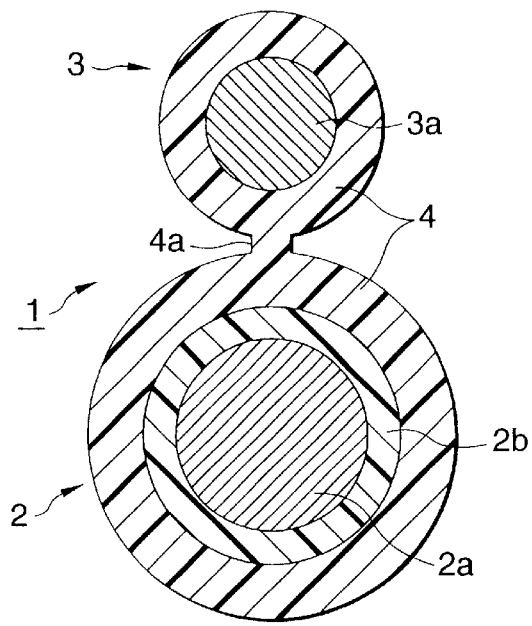
FIG. 3 is a cross-sectional view showing a self-supporting-type cable (one example of a wire harness) of a hanger gourd-shape including a cable body portion and a wire support portion.
Figure 4A:
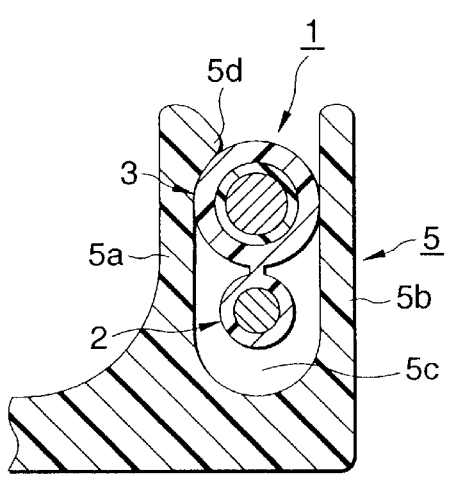
FIG. 4A is a cross-sectional view of a related clamp, showing a condition in which the cable body portion of the self-supporting-type cable is held in a normal, proper posture by the clamp.
Figure 4B:
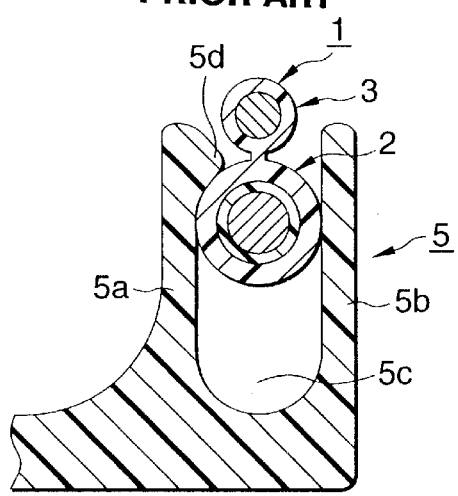
FIG. 4B is a view similar to FIG. 4A, but showing a condition in which the cable body portion is first fitted, and is held in an inverted posture by the related clamp.

In the installation of the self-supporting-type cable 1 shown in FIG. 3, this cable 1 is fixed to a mounting panel or the like by the clamps 10 at suitable portions thereof spaced along the length thereof.

Figure 2A:
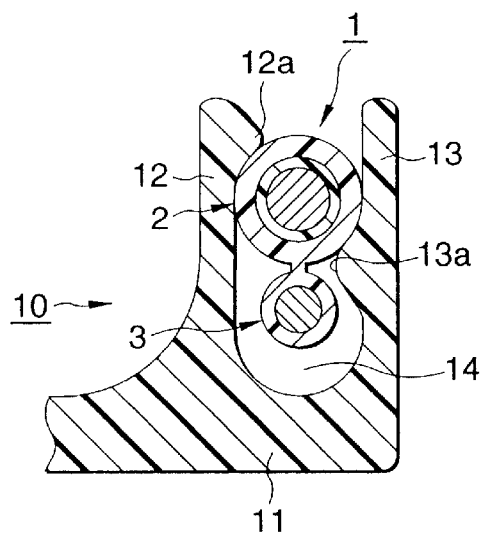
FIG. 2A is a cross-sectional view of the clamp, showing a condition in which a cable body portion of a self-supporting-type cable is held in a normal, proper posture by the clamp.

As shown in FIG. 2A, the self-supporting-type cable 1 is fitted into the holding recess 14 in the clamp 10 in such a manner that the support wire portion 3 is directed downwardly, and is first easily introduced into this holding recess 14, and the cable body portion 2 is held and retained between the left and right elastic holding portions 12 and 13 by the elastic force of the resin. At this time, the cable body portion 2 is held between the elastic holding portions 12 and 13 in a presscontacted manner, and also is held between and engaged with the retaining projections 12a and 13a provided respectively on the left and right elastic holding portions 12 and 13 in stepped relation to each other. Therefore, the cable body portion 2 will not be disengaged from the holding recess 14, and is firmly held by the clamp in a stable condition.

Figure 2B:
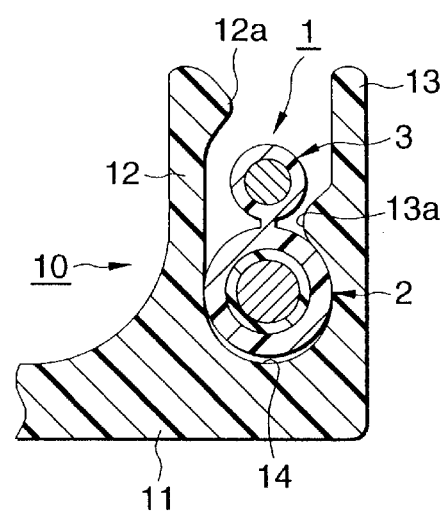
FIG. 2B is a view similar to FIG. 2A, but showing a condition in which the cable body portion is first fitted, and is held in an inverted posture by the clamp.

On the other hand, there are occasions when the self-supporting-type cable 1 is inadvertently held by the clamp 10 in such a manner that the cable body portion 2 is directed downwardly, and is first introduced into the holding recess 4, as shown in FIG. 2B. Even in such a case, the cable body portion 2 is pressed obliquely downwardly against the bottom of the holding recess 14 by the retaining projection 13a of the elastic holding portion 13, and even when the support wire portion 3, disposed at a higher level, is thus in a free condition, the self-supporting-type cable 1 will not be disengaged from the clamp, and is held in a stable condition.

Even when the self-supporting-type cable 1 is held in either of the postures, shown respectively in FIGS. 2A and 2B, by the clamp 10, the cable 1 is stably held in the holding recess 14, and therefore the withdrawal of the cable 1 from the clamp 10 is prevented, and also the production of noises by the fluttering of the cable is prevented.

In the above embodiment, although the wire harness to be held by the clamp is the self-supporting-type cable 1 of a hanger gourd-shape, any other suitable cable can be held and fixed by this general-purpose clamp 10.

In the related art, the retaining projection is formed on only one of the elastic holding portions, and therefore there were occasions when the fixing of the wire harness was unstable. In the wire harness-fixing clamp of the present invention, however, the retaining projections are formed on the opposed elastic holding portions, respectively, and therefore even when the wire harness is set in any posture, the clamp can hold the wire harness in a stable manner.

In the wire harness-fixing clamp of the present invention, a specific example of the wire harness is the self-supporting-type cable, and even when the cable is set in a proper posture or an inverted posture, with the support wire portion or the cable body portion first introduced into the holding recess, the cable body portion is positively held in a press-contacted manner, and therefore the self-supporting-type cable is positively held in a stable condition.

In the wire harness-fixing clamp of the present invention, the retaining projections are formed on the suitable portions of the opposed elastic holding portions, respectively. More specifically, the one retaining projection is formed on one of the two elastic holding portions intermediate the opposite ends thereof, whereas the other retaining projection is formed on the distal end portion of the other elastic holding portion. With this construction, the cable body portion is held between the two retaining projections, and are press-contacted with these retaining projections to be prevented from withdrawal from the holding recess. Alternatively, the cable body portion is held between the one retaining projection and the bottom of the holding recess in a press-contacted manner, and therefore is stably held against withdrawal from the holding recess.

What is claimed is:

1. A wire harness-fixing clamp, comprising:

a clamp body;

a pair of elastic holding portions extending from the clamp body, the elastic holding portions being opposed to each other to form therebetween a holding recess, into which a wire is insertable, and which is operative to hold the wire, the wire having a first portion and a second portion, the second portion extending from the first portion, and the first portion having a diameter which is at least the size of a diameter of the second portion; and a plurality of retaining projections formed respectively on the elastic holding portions to project into the holding recess, the retaining projections being offset from each other in a longitudinal direction of the holding recess to form upper and lower holding areas, wherein none of the retaining projections on respective holding portions are directly across from each other, and wherein both of the upper and lower holding areas are operative to hold the first portion of the wire depending on an insertion direction of the wire.

2. The wire harness-fixing clamp of claim 1, wherein when the wire is held in the holding recess, the retaining projections are operative to engage the wire from such a direction as to prevent withdrawal of the wire from the holding recess.

3. The wire harness-fixing clamp of claim 1, wherein the retaining projections are formed in a bulged manner respectively on inner surfaces of the elastic holding portions.

4. The wire harness-fixing clamp of claim 1, wherein the wire is a self-supporting-type cable having a hanger gourd-shape.

5. The wire harness-fixing clamp of claim 1, wherein the wire includes a body portion, a connection portion, and a support wire portion connected to the body portion through the connection portion.

6. The wire harness-fixing clamp of claim 5, wherein when the wire is inserted into the holding recess so that the support wire portion is first introduced into the holding recess, the body portion is engaged with the retaining projections to be prevented from withdrawal from the holding recess.

7. The wire harness-fixing clamp of claim 6, wherein one of the retaining projections is formed on an intermediate portion of one of the elastic holding portions, and the other one of the retaining projections is formed on a distal end portion of the other one of the elastic holding portions, and wherein the retaining projections press-contact with the body portion of the wire.

8. The wire harness-fixing clamp of claim 7, wherein one of the retaining projections is formed on an intermediate portion of one of the elastic holding portions, and the other one of the retaining projections is formed on a distal end portion of the other one of the elastic holding portions, and wherein the one of the retaining projections and the bottom of the holding recess press-contact with the body portion of the wire.

9. The wire harness-fixing clamp of claim 5, wherein when the wire is inserted into the holding recess so that the body portion is first introduced and pressed into the holding recess, the body portion is engaged with one of the retaining projections and a bottom of the holding recess.

* * * * *